UNITED STATES PATENT OFFICE.

EMIL O. ECKLAND, OF KEOKUK, IOWA.

PROCESS OF MANUFACTURING STARCH, &c.

1,000,726.   Specification of Letters Patent.   Patented Aug. 15, 1911.

No Drawing.   Application filed June 24, 1910.   Serial No. 568,704.

*To all whom it may concern:*

Be it known that I, EMIL O. ECKLAND, a citizen of the United States, residing at Keokuk, in the county of Lee and State of Iowa, have invented new and useful Improvements in Processes of Manufacturing Starch, &c., of which the following is a full, clear, concise, and exact description.

My invention relates to improvements in processes for the treatment of grains, tubers and other starch bearing material preliminarily to the production of merchantable starch, glucose, sugar, etc.

The object of my invention is the utilization of a process by the use of which a purer grade of starch or finished product may be produced, while at the same time many of the objectionable features heretofore incident to such manufacture are eliminated.

A further object is the utilization of a process by means of which the finished product may be produced much more cheaply while at the same time the by-products will be made more available for use without expensive treatment.

These and such other objects as may hereinafter appear are attained by my process which is clearly set forth in the accompanying specification.

While my improved process may be used in the treating of a large number of products, in order to produce starch, glucose, sugar, etc., I will in the interest of clearness confine my description to its application to the treatment of maize in the production of starch.

Heretofore in the manufacture of starch two widely variant types of processes have been used, one the fermentation process and the other the sulfurous acid process; by reason of the great waste incident to the use of the former method as well as the peculiarly offensive odors given off from the by-products, rendering them in some cases useless for food purposes. The second, or sulfurous acid process, is in more general use.

The corn kernel comprises the epidermis or hull, which consists mainly of cellulose, the epicarpis or body of the kernel which consists largely of nitrogenous starchy matter and the germ or plumule.

The problem confronting the starch manufacturers is to first remove the plumule, then the hull and glutinous matter and finally recovering the largest possible percentage of starch. In carrying out this process heretofore the grain is soaked or steeped for a considerable length of time in vats containing warm water and sulfur dioxid, that is a sulfurous acid bath; this bath loosens the germ within its alveolus or socket and also somewhat softens the body of the kernel; the bath is then drawn off and the grain cracked or broken and the germ removed by floating it off or in any other desired manner. The broken or crushed grain is then shaken in sieves and drained to remove the starch milk, after which the material is ground into a pulp or mash, this pulp or mash is then passed over fine sieves and shaken and drained to remove all starch milk and gluten, leaving the bran on the sieves; water is ordinarily sprinkled over the mash or pulp during the last operation in order to remove as much starch and gluten as can be by washing.

The starch, gluten and water that has been removed from the grain throughout the process is passed over a run or table on which the starch collects, the water and gluten passing off. The gluten and bran forms what is termed gluten feed and the starch is removed or dried and purified by any of the well known methods. The sulfurous acid used in the process serves the double purpose of softening the hull and causing it to be more readily separated from the starchy portion and also sweetens the mass and prevents fermentation with its consequent great loss of starch which would be thereby converted.

In view of the copious introduction of water throughout the process it is often necessary to introduce additional quantities of sulfurous acid at different stages in order to obtain the best results from the use of the process. In this process it is customary to use a solution containing about 0.4 per cent. of sulfur dioxid and the resulting products both starch and feed also contain more or less acidity. For many purposes the value of the starch is impaired by the presence of the acid, and the gluten feed is not as satisfactory as a feeding stuff by reason of its acidity and the sulfur taste which is also quite noticeable.

To what extent the presence of the sulfurous acid makes the product injurious to health has not as yet been determined but it is clear that any process that will eliminate entirely its use will be of great value. The use of the acid in the process also makes it difficult to retain the services of men without the payment of higher wages as they object to the sulfurous fumes and disagreeable odors that are continually being given off from the material. A further objection incident to the use of the acid is that the acid acts injuriously on the machinery and material employed in and about the process causing them to eventually wear out, thus imposing the double burden of expense in purchasing new material and machinery and also the added cost of installation.

I have by extensive and long continued experiment found that by the use of ozone in the form of ozonated water as a bath in the preliminary treatment of the grain, I am able to attain better results than have been heretofore attained by the use of any previous process.

My process consists primarily in the steeping or soaking of grain in water saturated ozone for a predetermined time, say from 15 to 48 hours, depending on the condition of the grain, the water being preferably warmed. Not only does the ozone serve to soften the hull and render the subsequent separation of the starch easy but it does not leave any objectionable odor in the product; neither is its use attended by any disagreeable results to the men employed in the manufacture.

The ozone used may be produced by any of the well known methods and may be introduced in the process either as ozone or ozonized water at various stages in the process, the quantity of ozone used depending upon the material under treatment and varying to meet the peculiar conditions existing in each case. I find, however, that excellent results are obtained by using in the first bath a solution completely saturated with ozone, say about 1,000 volumes of water to 10 volumes of ozone and as the ozone escapes more ozone is injected, this being added in sufficient quantities to keep the solution completely saturated. In the event that the grain is a little green or the season is damp I may dispense with the additional ozone, that is, use only that contained in the initial bath, but for ordinary purposes I find it is best to have the solution at all times completely saturated with ozone as by this method the hull is more readily softened and the starch granules separated from the gluten and hulls. It is also well known that ozone possesses to a considerable degree the property of bleaching material with which it is brought in contact and I find that by its use in my process the ultimate product is practically colorless, thereby giving it a great advantage over the starch produced by the sulfurous acid process which is always more or less discolored or of a yellowish tinge.

Another valuable feature in connection with my process is the fact that by the use of ozone, all pathalogic organisms are destroyed the ozone thereby acting as a preservative while at the same time the organic matter is diminished in quality. The element of economy is also an important feature as the cost of the sulfur dioxid process is much greater than that of my ozone process.

The United States and State governments are placing more and more restrictions on the manufacture of edible products by the use of chemical processes and defining within narrow limits the quantity of deleterious elements permissible in such products; this is especially so with respect to sulfur acid products.

By the use of ozone without the use of any other chemical better results are attained than by any other process, the ozone remaining in the finished product is in no sense objectionable or injurious to health and the physical appearance of the products is greatly enhanced.

Having thus described my invention, what I claim as new and desire to secure by Letters Patent, is—

1. The improved process of treating grains, tubers and starch bearing products which consists in subjecting the material to the action of a bath saturated with ozone for a predetermined time.

2. The improved process of treating grains, tubers and starch bearing products which consists in subjecting the material to the action of a bath saturated with ozone for a predetermined time, reducing the material to a pulp and separating the starch from said pulp.

3. The improved process of treating grains, tubers and starch bearing products which consists in subjecting the material to the action of a bath consisting of water completely saturated with ozone for a predetermined time.

4. The improved process of treating grains, tubers and starch bearing products which consists in subjecting the material to the action of a bath consisting of water completely saturated with ozone for a predetermined time and additional ozone being supplied throughout the process to maintain a completely saturated solution.

5. The process of manufacturing starch which consists in soaking grain in a saturated solution of ozone, grinding the grain and removing the germ therefrom, reducing the material to a pulp, and separating the starch milk therefrom.

6. The process of manufacturing starch which consists in soaking grain in a solution saturated with ozone, grinding the grain and removing the germ therefrom, reducing the material to a pulp, and separating the starch milk therefrom, ozone being added throughout the process to maintain the solution at the predetermined degree of saturation.

In witness whereof, I have hereunto subscribed my name in the presence of two witnesses.

EMIL O. ECKLAND.

Witnesses:
C. J. ECKLAND,
CHARLES BENSON.